US012437982B2

(12) United States Patent
Uchiyama et al.

(10) Patent No.: US 12,437,982 B2
(45) Date of Patent: Oct. 7, 2025

(54) TIME-OF-FLIGHT MASS SPECTROMETER AND TUNING METHOD FOR THE SAME

(71) Applicant: SHIMADZU CORPORATION, Kyoto (JP)

(72) Inventors: Kosuke Uchiyama, Kyoto (JP); Tomoyuki Oshiro, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 396 days.

(21) Appl. No.: 18/194,069

(22) Filed: Mar. 31, 2023

(65) Prior Publication Data

US 2023/0386813 A1 Nov. 30, 2023

(30) Foreign Application Priority Data

May 30, 2022 (JP) ................................ 2022-087427

(51) Int. Cl.
*H01J 49/00* (2006.01)
*H01J 49/40* (2006.01)

(52) U.S. Cl.
CPC ...... *H01J 49/0036* (2013.01); *H01J 49/0031* (2013.01); *H01J 49/401* (2013.01)

(58) Field of Classification Search
CPC .. H01J 49/0036; H01J 49/0031; H01J 49/401; H01J 49/40; H01J 49/405; H01J 49/0009; H01J 49/022; H01J 49/403
USPC ................................................ 250/281, 282
See application file for complete search history.

(56) References Cited

U.S. PATENT DOCUMENTS 11,244,817 B2 * 2/2022 Oshiro ................ H01J 49/0009
2020/0158700 A1 5/2020 Ubukata
2021/0210316 A1 7/2021 Oshiro

FOREIGN PATENT DOCUMENTS

JP 2018-120804 A 8/2018
JP 2020-85602 A 6/2020
JP 6989008 B2 1/2022

OTHER PUBLICATIONS

"2.00 Kuromatogurafii Souron (General Theory of Chromatography)", Pharmaceuticals and Medical Devices Agency, [Online], [accessed on May 10, 2022], the Internet <URL: https://www.pmda.go.jp/files/000242610.pdf>.

* cited by examiner

*Primary Examiner* — Michael Maskell
(74) *Attorney, Agent, or Firm* — Sughrue Mion, PLLC

(57) ABSTRACT

Provided is a TOFMS having a measurement unit in which target ions are accelerated and sent into a flight space within which an electric field for causing ions to fly is created. A data-analysis processor (33) creates a spectrum based on data acquired by the measurement unit, where the spectrum shows a relationship between ion intensity and time-of-flight or m/z value. An index calculator (34) calculates, as an index concerning a peak in the spectrum, a time-of-flight or m/z-value difference between a midpoint of a first peak width at an intensity which equals the peak-top intensity multiplied by a first ratio and a midpoint of a second peak width at an intensity which equals the peak-top intensity multiplied by a second ratio smaller than the first ratio. An evaluation result storage section (35) evaluates the peak symmetry from the index and stores an evaluation result.

9 Claims, 5 Drawing Sheets

TIME-OF-FLIGHT MASS SPECTROMETER AND TUNING METHOD FOR THE SAME

TECHNICAL FIELD

The present invention relates to a time-of-flight mass spectrometer (TOFMS) and a tuning method for a TOFMS.

BACKGROUND ART

In recent years, mass spectrometers have been frequently used for the identification and quantitative determination of compounds contained in samples. In a TOFMS, which is one type of mass spectrometer, a specific amount of kinetic energy is imparted to ions originating from a sample. The ions are thereby accelerated and introduced into a flight space, and the time of flight of each ion which has flown a predetermined distance within the flight space is measured. Since this time of flight depends on the mass-to-charge ratio (m/z) of the ion, a mass spectrum showing the relationship between m/z value and ion intensity (amount of ions) can be created by converting the time of flight of each ion into an m/z value.

In general, TOFMSs are often used in the case where a high level of mass-resolving power or mass accuracy is required, as in the case of estimating the structure of an unknown compound from the result of a precise mass measurement. Therefore, not only an improvement in sensitivity but also a further improvement in mass-resolving power and mass accuracy have been required for TOFMS s.

Mass spectrometers are normally equipped with an auto-tuning function for automatically adjusting the voltages applied to the electrodes in specific sections which affect the behavior of the ions within the device (see Patent Literature 1 or other related documents). This auto-tuning is typically performed by tuning specific parameter values, including the voltages given to the related sections, so that the top intensity of a mass peak corresponding to a specific compound obtained in a measurement of a standard sample (this mass peak is hereinafter simply called a "peak") will be maximized, or so that the mass-resolving power calculated from the peak will be maximized.

CITATION LIST

Patent Literature

Patent Literature 1: JP 2018-120804 A
Patent Literature 2: JP 2020-85602 A

Non Patent Literature

Non Patent Literature 1: "2.00 Kuromatogurafii Souron (General Theory of Chromatography)", Pharmaceuticals and Medical Devices Agency, [Online], [accessed on May 10, 2022], the Internet

SUMMARY OF INVENTION

Technical Problem

However, a peak observed with a high level of sensitivity and mass-resolving power may have a peak-shape distortion, such as the leading or tailing edge of the peak being considerably large. The voltage values used in such a situation should not be adopted as a suitable voltage condition. For example, a peak that is significantly asymmetrical may potentially have another peak superposed at a close m/z value. A superposition of such a peak may cause the peak area to be different from the true value, which leads to a considerable error in intensity when, for example, the peak-area value determined by centroid processing is used as the intensity of the centroid peak. A high degree of asymmetry of a peak also causes a significant shift of the centroid position in the centroid processing, which leads to a significant error in m/z value. Accordingly, the degree of symmetry of a peak is a piece of useful information for understanding the tuned state of the device.

A conventionally known index representing the degree of symmetry of a peak is the asymmetry factor (or symmetry factor) described in Patent Literature 2 or Non Patent Literature 1. The asymmetry factor in Patent Literature 2 is calculated as follows.

Initially, the height of the peak top P is determined as reference height h, and height h1 which equals one tenth of h, for example, is located. Next, two points Pa and Pb having height h1 are located in the leading and tailing edges of the peak, respectively. The asymmetry factor "As" is defined as As=b/a, where "a" is the distance from the vertical line passing through the peak-top point P to point Pa, and "b" is the distance from the same vertical line to point Pb. When the symmetry is perfect, As=1. The value of As increases with an increase in the extent of the tailing. The symmetry factor (tailing factor) described in Non Patent Literature 2 is also similarly defined.

These conventional indices accurately represent the degree of symmetry of a peak when the number of discrete measurement points forming one peak profile (i.e., the number of data points) is large, or in other words, when those data points can almost exactly represent the shape of the peak profile. However, when the number of discrete measurement points forming one peak is small, the aforementioned indices may not satisfactorily represent the degree of symmetry of the true peak profile. The indices described in Patent Literature 2 and Non Patent Literature 1 are expected to be primarily used for a peak observed in a chromatogram. A chromatogram normally has a comparatively large number of discrete measurement points forming one peak. By comparison, in a mass spectrum, particularly, in a mass spectrum acquired with a TOFMS, it is often the case that the number of discrete measurement points forming one peak is small. Therefore, it is difficult to evaluate the degree of symmetry of a peak with a satisfactory level of accuracy by means of the conventional indices.

The present invention has been developed to solve this problem. Its primary objective is to provide a TOFMS capable of presenting an index by which the degree of symmetry of a peak can be correctly evaluated even when the number of measurement points forming the peak is small, as well as a method for tuning a TOFMS using that index.

Solution to Problem

One mode of the TOFMS according to the present invention developed for solving the previously described problem is a TOFMS having a measurement unit which includes a flight-field creation section configured to create, within a flight space, an electric field for causing ions to fly, and an ion acceleration section configured to accelerate ions which are a measurement target and to send the ions into the flight space, the TOFMS including:

a data-analysis processor configured to create a spectrum based on data acquired by the measurement unit, the spectrum showing a relationship between ion intensity and time of flight or mass-to-charge ratio;

an index calculator configured to calculate, as an index concerning a peak observed in the spectrum, a difference in time of flight or mass-to-charge ratio between a midpoint of a first peak width at an intensity which equals the top intensity of the peak multiplied by a first ratio and a midpoint of a second peak width at an intensity which equals the top intensity of the peak multiplied by a second ratio which is smaller than the first ratio; and an evaluation result storage section configured to evaluate a degree of symmetry of the peak from the index and to store an evaluation result.

One mode of the tuning method for a TOFMS according to the present invention developed for solving the previously described problem is a tuning method for a TOFMS having a measurement unit which includes a flight-field creation section configured to create, within a flight space, an electric field for causing ions to fly, and an ion acceleration section configured to accelerate ions which are a measurement target and to send the ions into the flight space, the tuning method including:

a data-analysis processing step for creating a spectrum based on data acquired by the measurement unit, the spectrum showing a relationship between ion intensity and time of flight or mass-to-charge ratio;

an index calculation step for calculating, as an index concerning a peak observed in the spectrum, a difference in time of flight or mass-to-charge ratio between a midpoint of a first peak width at an intensity which equals the top intensity of the peak multiplied by a first ratio and a midpoint of a second peak width at an intensity which equals the top intensity of the peak multiplied by a second ratio which is smaller than the first ratio; and a tuning step for tuning a voltage applied to an electrode included in the measurement unit, using at least either the index or another numerical value derived from the index.

Advantageous Effects of Invention

The previously described mode of the TOFMS according to the present invention can show users an evaluation result which reflects the degree of symmetry of the true peak profile more correctly than the asymmetry factor or other conventionally used indices, even when the number of discrete measurement points (data points) forming the peak observed in the spectrum is small.

By the previously described mode of the tuning method for a TOFMS according to the present invention, a voltage applied to an electrode included in the measurement unit can be properly tuned so that the peak profile will have a satisfactory degree of symmetry.

DESCRIPTION OF EMBODIMENTS

A quadrupole time-of-flight mass spectrometer (which may be hereinafter called the "Q-TOFMS") as one embodiment of the TOFMS according to the present invention is hereinafter described with reference to the attached drawings.

The present Q-TOFMS is a tandem type of mass spectrometer in which a quadrupole mass filter is combined with an orthogonal acceleration TOFMS. It is capable of selectively carrying out either a normal mass spectrometric analysis which includes no dissociation of ions or an MS/MS analysis which includes the dissociation of a specific ion.

Figure 1:
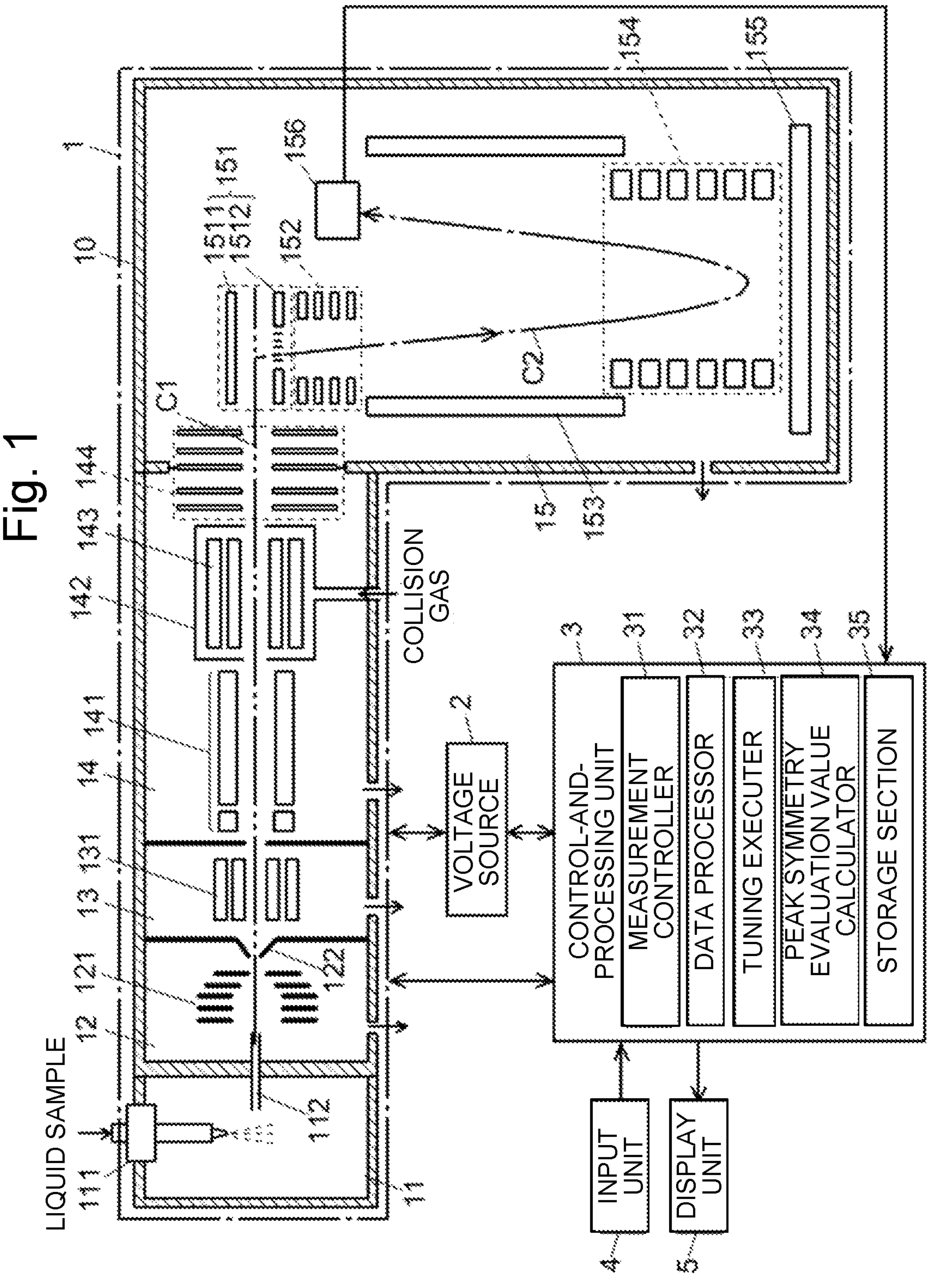
FIG. 1 is a configuration diagram of the main components of a quadrupole time-of-flight mass spectrometer as one embodiment of the present invention.

FIG. 1 is a configuration diagram of the main components of the Q-TOFMS according to the present embodiment.

As shown in FIG. 1, this Q-TOFMS includes a measurement unit 1, voltage source 2, control-and-processing unit 3, input unit 4 and display unit 5.

The measurement unit 1 is a unit for performing a measurement on a sample (liquid sample). This unit includes a vacuum chamber 10 and an ionization chamber 11 connected to the front end of the vacuum chamber 10. The inner space of the vacuum chamber 10 is roughly divided into four chambers: the first intermediate vacuum chamber 12, second intermediate vacuum chamber 13, first analysis chamber 14 and second analysis chamber 15. The ionization chamber 11 is maintained at substantially atmospheric pressure. These chambers are configured to form a multi-stage differential pumping system in which the degree of vacuum sequentially increases in a stepwise manner from the ionization chamber 11, through the first intermediate vacuum chamber 12, second intermediate vacuum chamber 13 and first analysis chamber 14 to the second analysis chamber 15.

In FIG. 1, the vacuum pumps for evacuating each chamber are omitted. Typically, the first intermediate vacuum chamber 12 next to the ionization chamber 11 is evacuated by a rotary pump, while the subsequent chambers are each evacuated by a turbomolecular pump combined with a rotary pump employed as a roughing vacuum pump.

The ionization chamber 11 is provided with an electrospray ionization (ESI) source 111. The ionization chamber 11 communicates with the first intermediate vacuum chamber 12 through a thin desolvation tube 112. The first intermediate vacuum chamber 12 contains a multi-pole ion guide 121. The first intermediate vacuum chamber 12 is separated from the second intermediate vacuum chamber 13 by a skimmer 122 having an opening at its apex. The second intermediate vacuum chamber 13 also contains a multi-pole ion guide 13. The first analysis chamber 14 contains a quadrupole mass filter 141, a collision cell 142 having a multi-pole ion guide 143 inside, as well as the first part of a transfer electrode 144. The second analysis chamber 15 contains the second part of the transfer electrode 144, an orthogonal accelerator 151 including a push-out electrode 1511 and a pulling electrode 1512, a second acceleration electrode unit 152, a flight tube 153, a reflectron 154, a back plate 155 and an ion detector 156.

The voltage source 2 applies a predetermined voltage to each of the electrodes in the related sections of the measurement unit 1 according to the control of the control-and-processing unit 3. For example, those electrodes are specifically included in the ESI source 111, ion guides 121, 131 and 143, quadrupole mass filter 141, transfer electrode 144, orthogonal accelerator 151, second acceleration electrode unit 152, flight tube 153, reflectron 154, back plate 155 and ion detector 156. The "predetermined" voltage may be a direct voltage, pulse voltage, radiofrequency (RF) voltage, alternating voltage having a lower frequency than the RF voltage, or superposition of two or more of the previously mentioned types of voltages.

The control-and-processing unit 3 is a unit for controlling the measurement unit 1 directly or through the voltage source 2, as well as receiving detection signals obtained in the measurement unit 1 and processing those signals. The control-and-processing unit 3 includes, as its functional blocks, a measurement controller 31, data processor 32, tuning executer 33, peak symmetry evaluation value calculator 34 and storage section 35.

In normal cases, the control-and-processing unit 3 is actually a personal computer (PC), on which the functions in the previously described functional blocks can be implemented by executing, on the PC, dedicated control-and-processing software installed on the same PC. In that case, the input unit 4 includes a keyboard and a pointing device (e.g., mouse) provided for the PC. The display unit 5 is a monitor display provided for the PC.

An example of an MS/MS analysis operation carried out in the Q-TOFMS according to the present embodiment is hereinafter schematically described. In a normal mass spectrometric analysis and an MS/MS analysis, the measurement controller 31 controls the voltage source 2 based on various parameter values saved in the storage section 35. According to the control, the voltage source 2 gives a predetermined voltage to each related section in the measurement unit 1.

The ESI source 111 is continuously supplied with a liquid sample which contains, for example, compounds separated from each other by a liquid chromatograph (LC, which is not shown). The ESI source 111 ionizes the compounds in the liquid sample by spraying the supplied liquid sample into the ionization chamber 11 while imparting electric charges to the liquid. It should be noted that the ionization technique is not limited to the ESI method; an ion source employing a different type of technique, such as an atmospheric pressure chemical ion source, may also be used. An ion source for ionizing a gas sample or solid sample, as opposed to a liquid sample, may also be used.

Ions originating from sample components generated in the ionization chamber 11, as well as fine charged droplets from which the solvent has not been sufficiently vaporized, are drawn into the desolvation tube 112 mainly by a gas stream produced by a difference between the pressure within the ionization chamber 11 (substantially atmospheric pressure) and the pressure within the first intermediate vacuum chamber 12. The desolvation tube 112 is heated to an appropriate temperature. Passing the charged droplets through this desolvation tube 112 promotes the vaporization of the solvent in those droplets, whereby the generation of ions originating from the sample components are further promoted.

The ions ejected from the exit end of the desolvation tube 112 into the first intermediate vacuum chamber 12 are converged into the vicinity of the ion beam axis C1 due to the effect of the radiofrequency electric field created by the ion guide 121. The converged ions enter the second intermediate vacuum chamber 13 through the opening at the apex of the skimmer 122. The ions which have entered the second intermediate vacuum chamber 13 are forwarded to the first analysis chamber 14 while being converged by the radiofrequency electric field created by the ion guide 131.

The ions which have entered the first analysis chamber 14 are introduced into the quadrupole mass filter 141, where only an ion having a specific m/z corresponding to the voltage applied to the quadrupole mass filter 141 is allowed to pass through this mass filter 141. A collision gas, such as argon or nitrogen, is continuously or intermittently supplied into the collision cell 142. An ion (precursor ion) which has passed through the quadrupole mass filter 141 and entered this collision cell 142, having a predetermined amount of energy, comes in contact with the collision gas and undergoes collision-induced dissociation, whereby the ion is divided into fragments, generating various product ions. The product ions are converged by the radiofrequency electric field created by the ion guide 143 and are ejected from the collision cell 142.

The various product ions which have exited from the collision cell 142 are converged by the transfer electrodes 144 consisting of a plurality of ring-shaped electrodes and are sent into the second analysis chamber 15. The ions introduced into the second analysis chamber 15 by the transfer electrode 144 form a thin, highly collimated ion stream and enter the orthogonal accelerator 151, in which the ions are ejected in the substantially orthogonal direction to the incident direction of the ion stream (which is parallel to the ion beam axis C1) in a pulsed form, i.e., as an ion packet which roughly forms a single mass.

The ions included in this ion packet are further accelerated in the second acceleration electrode unit 152 and introduced into the flight space within the flight tube 153. Within this flight space, an electric field for causing ions to follow a folded flight path as indicated by line C2 in FIG. 1 is created by the flight tube 153, reflectron 154 and back plate 155. After being repelled by this electric field, the ions fly once more within the flight tube 153 and ultimately arrive at the ion detector 156. The ion detector 156 includes, for example, a microchannel plate and produces a detection signal corresponding to the number of incident ions. This signal is sent to the control-and-processing unit 3.

In an ideal case, the same amount of kinetic energy is imparted to each ion in the orthogonal accelerator 151 and the second acceleration electrode unit 152. Therefore, each ion flies at a speed corresponding to its m/z value. More specifically, an ion having a smaller m/z value has a higher speed and arrives at the ion detector 156 earlier. Accordingly, the various ions included in the ion packet and almost simultaneously introduced into the flight space (i.e., various product ions generated from a single kind of precursor ion) are spatially separated from each other according to their respective m/z values during their flight and have time differences in hitting the ion detector 156.

The orthogonal accelerator 151 and the second acceleration electrode unit 152 correspond to the ion acceleration section in the present invention. The flight tube 153, reflectron 154 and back plate 155 correspond to the flight-field creation section in the present invention.

The data processor 32 in the control-and-processing unit 3 receives the detection signal from the ion detector 156, converts the same signal into digital data and saves the same data. The data processor 32 also converts, into an m/z value, the time of flight of each ion measured from the point in time of the ejection of the ion packet from the orthogonal accelerator 151 and creates a mass spectrum (product ion spectrum) showing the relationship between m/z value and ion intensity. The created mass spectrum is displayed on the display unit 5 according to a user's instruction given from the input unit 4.

The description thus far has been concerned with an MS/MS analysis operation. A mass spectrum can also be acquired by performing a normal mass spectrometric analysis in place of the MS/MS analysis by omitting the selection of an ion with the quadrupole mass filter 141 and allowing all ions to pass through as well as omitting the dissociation of ions within the collision cell 142. Even in that case, a mass spectrum with a high level of mass-resolving power and mass accuracy can be obtained since the mass separation of the ions is performed in the orthogonal acceleration TOFMS.

In order to achieve high sensitivity, high mass-resolving power and high mass accuracy in the Q-TOFMS according to the present embodiment, it is necessary to appropriately tune the voltages applied to the electrodes in the related sections included in the measurement unit 1. The present Q-TOFMS has an auto-tuning function for automatically and appropriately tuning those voltages.

For a TOFMS, a tuning method is commonly known in which the voltages applied to the related electrodes are sequentially tuned so as to maximize, for example, the sensitivity in a measurement of a standard sample, or more specifically, so as to maximize the top intensity of a peak corresponding to a specific compound. Another tuning method is also commonly known in which the voltages applied to the related electrodes are sequentially tuned so as to maximize the mass-resolving power of a peak corresponding to a specific compound. Japanese Patent No. 6989008, proposed by the present applicant, describes one example, in which the peak width at an intensity which equals 50% of the peak intensity and the peak width at an intensity which equals 10% are used to tune the voltage applied to an electrode. By using not only the peak width at the intensity which equals 50% of the peak intensity but also the peak width at a lower intensity, the voltage condition can be determined so that the peak distortion will be decreased.

Figure 3:
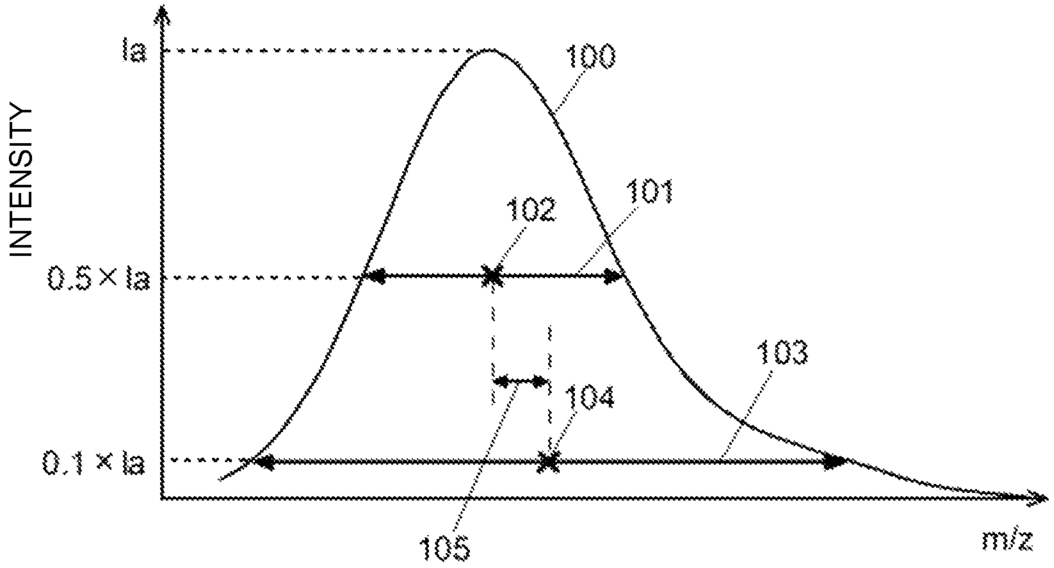
FIG. 3 is a conceptual diagram for explaining the method for calculating a peak symmetry evaluation value in the present embodiment.

However, the method described in Japanese Patent No. 6989008 cannot determine the degree of asymmetry of the peak waveform. Accordingly, the voltage may possibly be tuned such that only either the leading or tailing edge of the peak becomes large. By comparison, in the Q-TOFMS according to the present embodiment, when the auto-tuning is performed, a measurement on the standard sample is performed while the voltage applied to the electrode is gradually varied. When the sensitivity, mass-resolving power and other indices are subsequently determined based on the measurement result, an evaluation value showing the degree of symmetry is calculated by the peak symmetry evaluation value calculator 34 in addition to the aforementioned existing indices. One example of the method for calculating an evaluation value showing the degree of symmetry of the peak is hereinafter described based on FIG. 3. FIG. 3 is a conceptual diagram for explaining the method for calculating the peak symmetry evaluation value.

As shown in FIG. 3, the peak profile 100 has a peak top $P_0$ with intensity Ia. For this peak, the peak symmetry evaluation value calculator 34 performs the following calculations: Points $P_1$ and $P_2$ at an intensity which equals 50% of Ia (0.5×Ia) as well as points $P_3$ and $P_4$ at an intensity which equals 10% of Ia (0.1×Ia) are located. The midpoint 102 of the first peak width 101 between points $P_1$ and $P_2$ as well as the midpoint 104 of the second peak width 103 between points $P_3$ and $P_4$ are located. The distance 105 between the two midpoints 102 and 104 is calculated. This distance 105 is represented by a value having a plus/minus sign with reference to one of the two midpoints 102 and 104. If the midpoint 102 is located at m/z A and the midpoint 104 is located at m/z B, the distance L can be calculated by L=B−A. For example, if the midpoints 102 and 104 are located at m/z 200 and m/z 190, respectively, then distance L=−10.

In FIG. 3, the unit of the distance 105 is Da or u, for example, since this distance 105 is determined for a peak on a mass spectrum. The distance 105 may be alternatively determined for a peak on a time-of-flight spectrum in which the time-of-flight values are not converted into m/z values. In that case, the unit is μsec (or nsec), for example.

The numerical values of 50% and 10% used as the percentages which determine the intensities for calculating the peak widths are mere examples and can be appropriately changed. Specifically, the "50%" intensity can be appropriately selected within a range of roughly 40-60%. The "10%" intensity can be appropriately selected within a range of roughly 5-30%. The lower limit, 5%, of the percentage is a value which depends on the noise condition in the mass spectrum (or time-of-flight spectrum); the lower limit needs to be higher in a situation in which the noise level is comparatively high, or conversely, the lower limit may be less than 5% if the noise level is low.

The two points for calculating the distance do not always need to be the midpoints of the first and second peak widths; it is also possible to divide each peak width into a predetermined number of segments and use the resulting division points. For example, each of the first and second peak widths may be divided into three segments, and the leftmost division point in each peak width may be used in place of the midpoint to calculate of the distance. As another example, each of the first and second peak widths may be divided into three segments, and the leftmost division point in the first peak width and the rightmost division point in the second peak width may be used in place of the two midpoints, respectively, to calculate the distance. In summary, the distance 105 may be any appropriate distance between two internal division points respectively selected in the two peak widths according to specific rules.

Figure 4A:
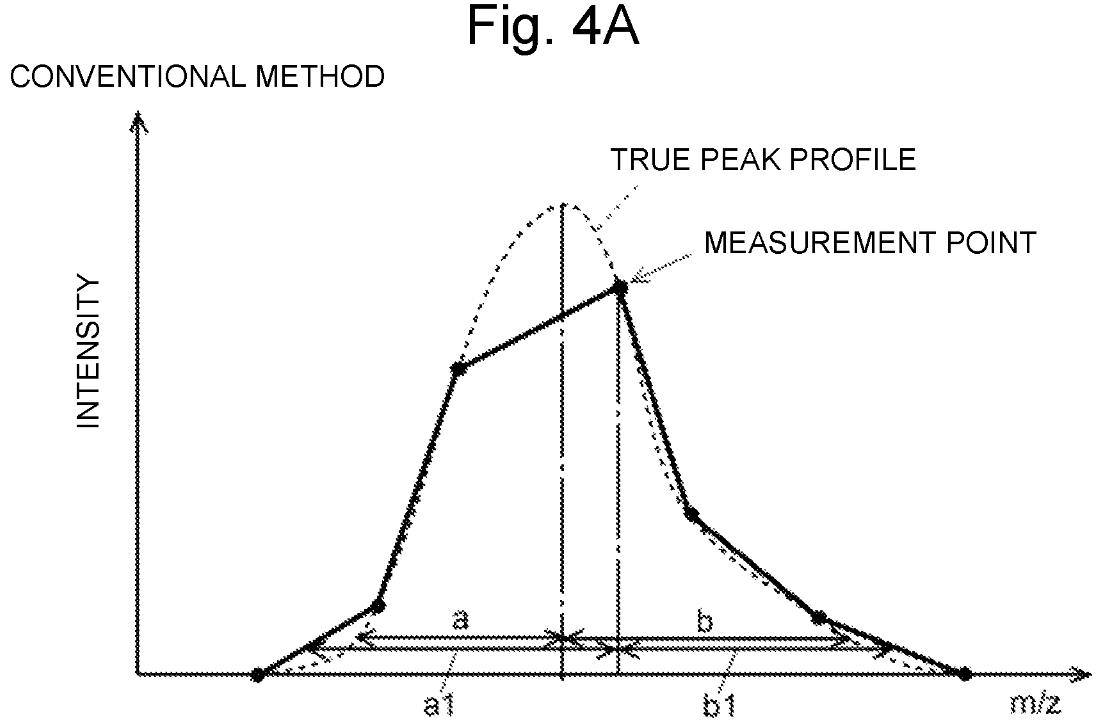
FIGS. 4A and 4B are conceptual diagrams for explaining a comparison of a conventional asymmetry factor and the peak symmetry evaluation value as one mode of the present embodiment in the case where the number of measurement points forming one peak is small.
Figure 4B:
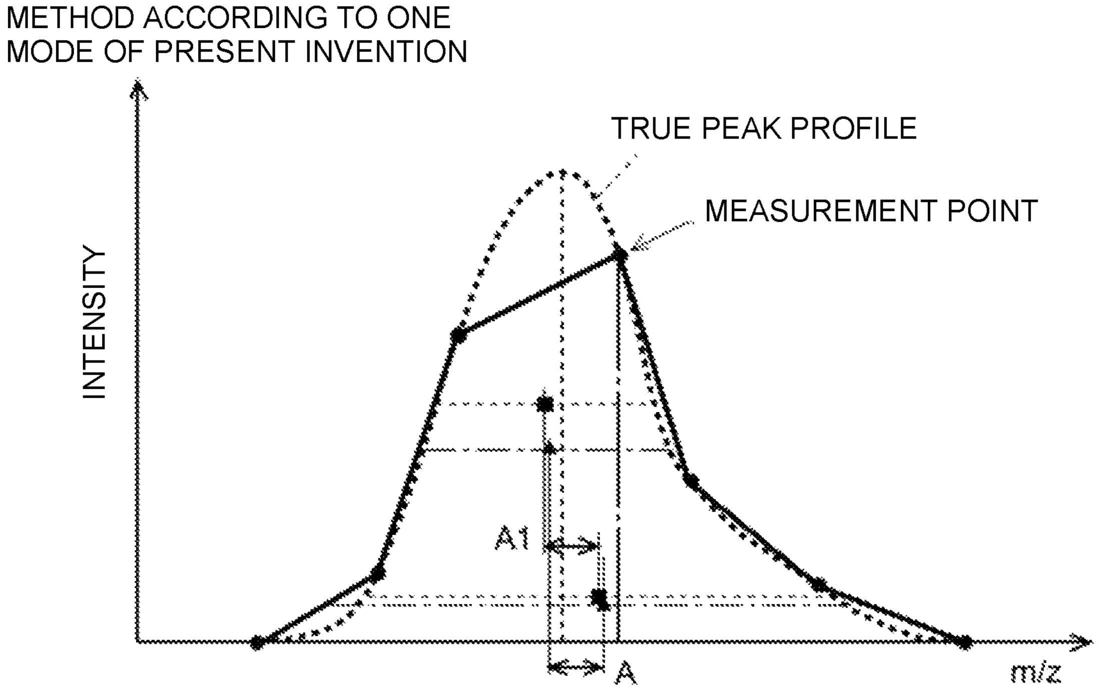

FIGS. 4A and 4B are conceptual diagrams for explaining a comparison of a conventional asymmetry factor and the peak symmetry evaluation value according to the present embodiment in the case where the number of measurement points forming one peak is small. In this example, one peak profile is formed by five measurement points. In this case, there is a significant discrepancy between a measurement-based peak formed by connecting the measurement points by line segments (this peak is hereinafter called the "measured peak") and the true peak profile drawn by the broken line. As shown in FIG. 4A, the asymmetry factor in the measured peak is b1/a1, while the asymmetry factor in the true peak profile is b/a. There is a significant difference between the two asymmetry factors. A major cause of this difference is that the position indicating the peak top on the horizontal axis is significantly displaced due to the small number of measurement points.

By comparison, for the calculation of the aforementioned peak symmetry evaluation value, the intensity of the peak top is used in order to determine the intensity at which the peak widths should be determined, whereas the position indicating the peak top on the horizontal axis is not used. As shown in FIG. 4B, although there is a considerable difference in peak-top intensity between the measured peak and the true peak profile, the influence of this difference in peak-top intensity is considerably reduced since the intensities at which the peak widths are determined are at much lower levels, i.e., 50% and 10% of the peak-top intensity. Therefore, only an insignificant difference occurs between the measured peak and the true peak profile in terms of the peak widths at the intensities of 50% and 10%. Thus, when the number of measurement points forming one peak is small, the peak symmetry evaluation value more correctly represents the degree of asymmetry of the peak than the conventional asymmetry factor.

Figure 2:
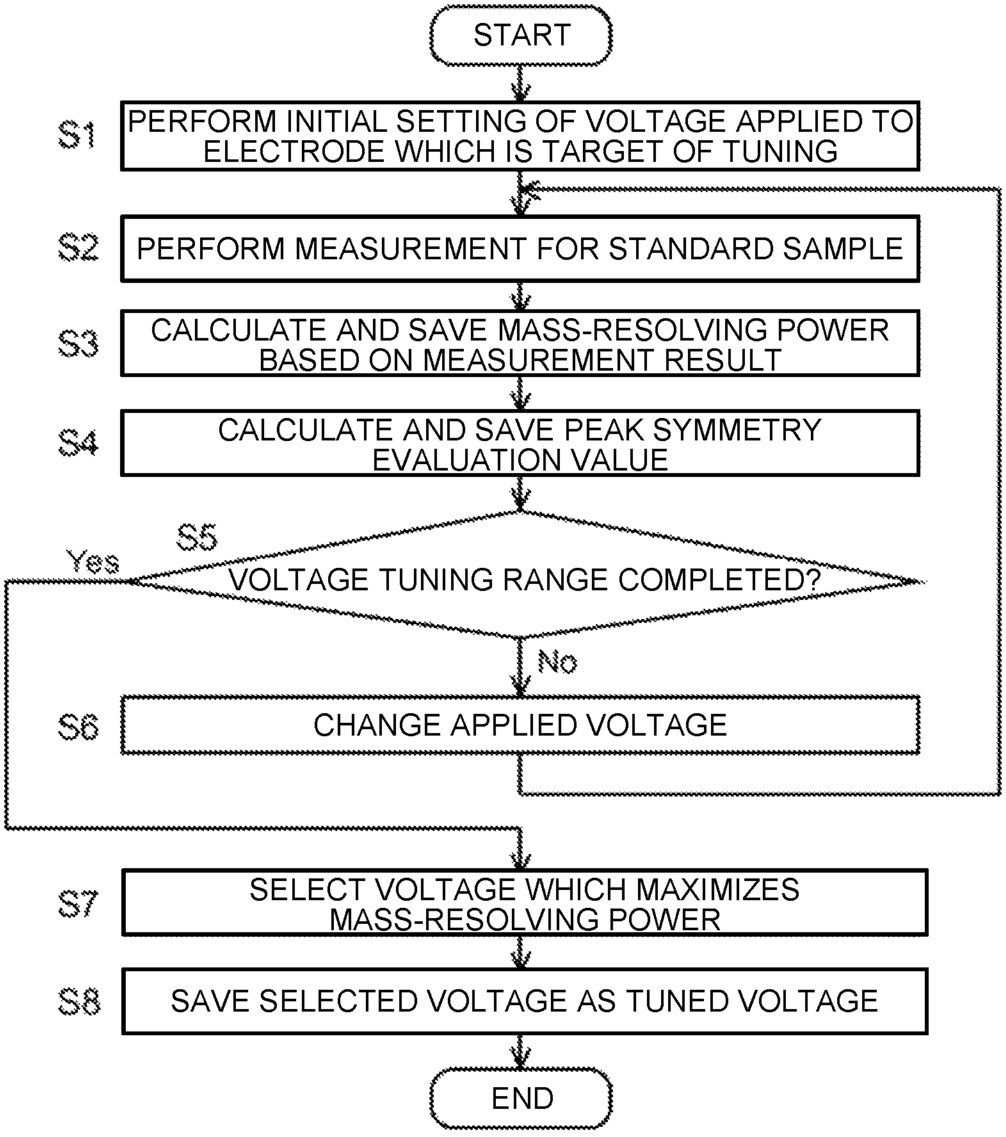
FIG. 2 is a flowchart showing the flow of an auto-tuning operation in the quadrupole time-of-flight mass spectrometer according to the present embodiment.

Next, an operation in the auto-tuning process in the Q-TOFMS according to the present embodiment is described. FIG. 2 is a flowchart showing one example of the flow of the auto-tuning operation.

For example, when a user has performed a predetermined operation with the input unit 4, the tuning executer 33 in the control-and-processing unit 3 performs the auto-tuning according to a predetermined program. In the auto-tuning, the voltages applied to a plurality of electrodes included in the measurement unit 1 are sequentially tuned. FIG. 2 shows the flow of the operation for tuning the voltage applied to one of those electrodes. As one example, the following description deals with the case of tuning voltages given to the orthogonal accelerator 151.

Initially, the tuning executer 33 sets the initial values of the voltages to be given to the orthogonal accelerator 151 (Step S1). That is to say, voltage values previously set in the last operation, or voltage values specified as default values, are read from the storage section 35. The voltage source 2 is controlled so that the voltages corresponding to the read voltage values are applied to the push-out electrode 1511 and the pulling electrode 1512 in the orthogonal accelerator 151, respectively. The voltages applied to the electrodes other than those of the orthogonal accelerator 151 are set at the voltage values determined in the previous tuning, or at predetermined default values.

Under the control of the tuning executer 33, the measurement unit 1 performs a normal mass spectrometric analysis over a predetermined range of m/z values for a standard sample (Step S2). The standard sample contains one or more known compounds at known concentrations. For example, the standard sample can be introduced into the ESI source 111 in place of a normal liquid sample. Alternatively, a dedicated ionization probe for the electrospray ionization of the standard sample may be provided in addition to the ESI source 111.

The data processor 32 collects measurement data obtained in Step S2 and creates a mass spectrum around a predetermined m/z value. Then, the data processor 32 extracts a peak corresponding to a known compound in the mass spectrum, calculates the mass-resolving power from the height and width of that peak, relates the mass-resolving power to the voltage values given to the orthogonal accelerator 151, and saves these pieces of information in the storage section 35 (Step S3). The peak symmetry evaluation value calculator 34 computes the peak symmetry evaluation value for the same peak according to the previously described procedure, relates this value to the aforementioned voltage values and saves these pieces of information in the storage section 35 (Step S4).

Next, the tuning executer 33 determines whether or not the value of the latest voltage given to the orthogonal accelerator 151 has exceeded a predetermined tuning range (Step S5). If that voltage value is within the tuning range, the voltage value is changed by a predetermined step width. (Step S6), and the operation returns to Step S2. In Step S2, the measurement unit 1 performs the measurement for the standard sample under the changed voltage value. Thus, through the repetition of Steps S2-S6, the value of the voltage given to the orthogonal accelerator 151 is repeatedly changed by the predetermined step width, starting from the initial value, until the value exceeds the previously set tuning range, and the measurement for the same standard sample is repeatedly performed. During this repeat of the measurement, the mass-resolving power and the peak symmetry evaluation value are related to the voltage value and saved in the storage section 35 as log information of the auto-tuning process.

After the voltage given to the orthogonal accelerator 151 has exceeded the tuning range, the operation proceeds from Step S5 to Step S7, and the tuning executer 33 compares the values of the mass-resolving power saved in the storage section 35 to identify the voltage value which gives the highest mass-resolving power (Step S7). Then, the identified voltage value is saved in the storage section 35 as the tuned voltage parameter to be given to the orthogonal accelerator 151 (Step S8).

Thus, in the Q-TOFMS according to the present embodiment, the voltages given to the orthogonal accelerator 151 are tuned so as to maximize the mass-resolving power. Although the peak symmetry evaluation value is not used for the voltage-tuning operation in the present example, that value is recorded as log information in the storage section 35. The user can retrieve the log information and display it on the display unit 5 by performing a predetermined operation from the input unit 4 at an appropriate point in time, e.g., immediately after the completion of the auto-tuning, or when the measurement result has been found to be suspect. Thus, the user can check the peak symmetry evaluation value after the completion of the auto-tuning as well as during the auto-tuning. When maintenance work of the device is performed by a maintenance service person, the peak symmetry evaluation value after the completion of the auto-tuning as well as during the auto-tuning can be checked to understand the previous condition of the device and perform the appropriate troubleshooting.

Even when the mass-resolving power is high, the peak may possibly be considerably asymmetrical for some reasons, e.g., due to the leading or tailing edge of the peak being significantly large. Such a distortion in the shape of the peak waveform leads to an error in peak intensity and/or an error in m/z value, particularly when the centroid processing is performed. Accordingly, a maintenance service person who has received a complaint from the user, such as a decrease in mass accuracy, can check the peak symmetry evaluation value in the log information to determine whether or not the asymmetry of the peak is a possible cause of the decrease in mass accuracy.

The log information is a set of data saved in the storage section 35. Accordingly, when the PC embodying the control-and-processing unit 3 can connect to an external server via the Internet or similar data communication line, the maintenance service person can remotely examine the log information and perform at least some of the troubleshooting tasks from a remote location from the installation site of the device.

In the previous description, the distance 105 illustrated in FIG. 3 was directly used as the peak symmetry evaluation value. A value obtained by normalizing the distance by the observed m/z value may also be used as the evaluation value. For example, the evaluation value can be calculated by dividing the distance by the m/z value corresponding to the midpoint of the peak width at an intensity of 50%. The evaluation value obtained in this manner is independent of the m/z value, and therefore, in some cases, it may be more preferable as an index indicating the degree of asymmetry of the peak shape. The evaluation result showing the peak symmetry does not always need to be represented by a specific numerical value, like the peak symmetry evaluation value; for example, it is possible to evaluate a peak by determining which level the peak belongs to among a plurality of previously defined levels of symmetry.

In the previous description, the voltage given to the orthogonal accelerator 151 was tuned so as to maximize the mass-resolving power. The given voltage may alternatively be tuned so as to maximize the sensitivity, i.e., to maximize the intensity of a specific peak, in place of the mass-resolving power. As disclosed in Japanese Patent No. 6989008, a plurality of peak widths at different intensities may be used for the tuning of the given voltage. A voltage condition which provides a high performance on a general basis may be searched for in the combination of two or more factors related to the performance of a mass spectrometer, such as the mass-resolving power, sensitivity and shape of the peak waveform, rather than a single index, such as the mass-resolving power or sensitivity.

For example, in a method described in Japanese Patent Application No. 2022-074176, which is a prior application by the applicant, a score value is calculated from the peak-top intensity and mass-resolving power, based on a predetermined calculation formula, and a search for a voltage condition which maximizes this score value is conducted. This search is performed since the voltage condition which maximizes the sensitivity is not always identical to the voltage condition which maximizes the mass-resolving power in an orthogonal acceleration TOFMS. By the proposed method, a voltage condition can be found which strikes a balance between sensitivity and mass-resolving power, and yet provides a nearly maximum mass-resolving power. In summary, in the Q-TOFMS according to the present embodiment, there is no specific limitation on the index which represents the device performance for the tuning of the voltage in the auto-tuning process. What is required is to calculate a peak symmetry evaluation value and retain it along with any index available for the tuning.

The previous description was concerned with the case of tuning the voltage given to the orthogonal accelerator 151 in the auto-tuning process. A voltage applied to an electrode in other sections, such as a voltage applied to the flight tube 153, reflectron 154 or transfer electrode 144, can also be similarly tuned. It is also possible to handle a plurality of the electrodes as one group and tune the applied voltages for each group, instead of individually tuning each of the voltages applied to the electrodes in those sections.

As described earlier, the Q-TOFMS according to the present embodiment allows the user or maintenance service person to check the peak symmetry evaluation value in the log information. Therefore, for example, a voltage value which makes the peak symmetry evaluation value closest to zero (i.e., which makes the leading and tailing edges comparable to each other) can be re-selected as the tuned voltage parameter in place of the voltage value that maximizes the mass-resolving power.

The peak symmetry evaluation value may also be used for the manual re-tuning of the voltage value. Specifically, this tuning can be performed as follows.

The peak symmetry evaluation value shows which of the leading and tailing edges of the peak is larger as well as how large their difference is. The voltage source 2 applies the same direct voltage to both the push-out electrode 155 and the pulling electrode 1512 in the orthogonal accelerator 151 during the period of time for receiving ions from the transfer electrode 144. During the period of time for ejecting ions from the orthogonal accelerator 151, the voltage source 2 either applies only a pulse voltage for pushing ions to the push-out electrode 1511, or simultaneously applies both a pulse voltage for pushing ions to the push-out electrode 1511 and a pulse voltage for pulling ions to the pulling electrode 1512. In the case where the same direct voltage is applied to both the push-out electrode 1511 and the pulling electrode 1512 during the period of time for receiving ions, the ions which have entered the orthogonal accelerator 151 travel along the ion beam axis C1.

By comparison, when a difference is intentionally provided between the direct voltages applied to the push-out electrode 1511 and the pulling electrode 1512, the ions which have entered the orthogonal accelerator 151 travel in a path which is curved upward or downward with respect to the ion beam axis C1 in FIG. 1. If the pulse voltage for ejecting ions is applied in the situation in which the ions are deviating upward from the ion beam axis C1 within the orthogonal accelerator 151, the effective flight distance of the ions will be longer, so that the tailing portion will increase. Conversely, if the pulse voltage for ejecting ions is applied in the situation in which the ions are deviating downward from the ion beam axis C1 within the orthogonal accelerator 151, the effective flight distance of the ions will be shorter, so that the leading edge will increase. Therefore, if it is possible to recognize, from the peak symmetry evaluation value, which of the leading and tailing edges of the peak is larger as well as how large their difference is, the user or maintenance service person can understand which electrode needs a change in the applied voltage by what amount and can promptly tune that voltage so as to reduce the peak symmetry evaluation value accordingly.

Figure 5:
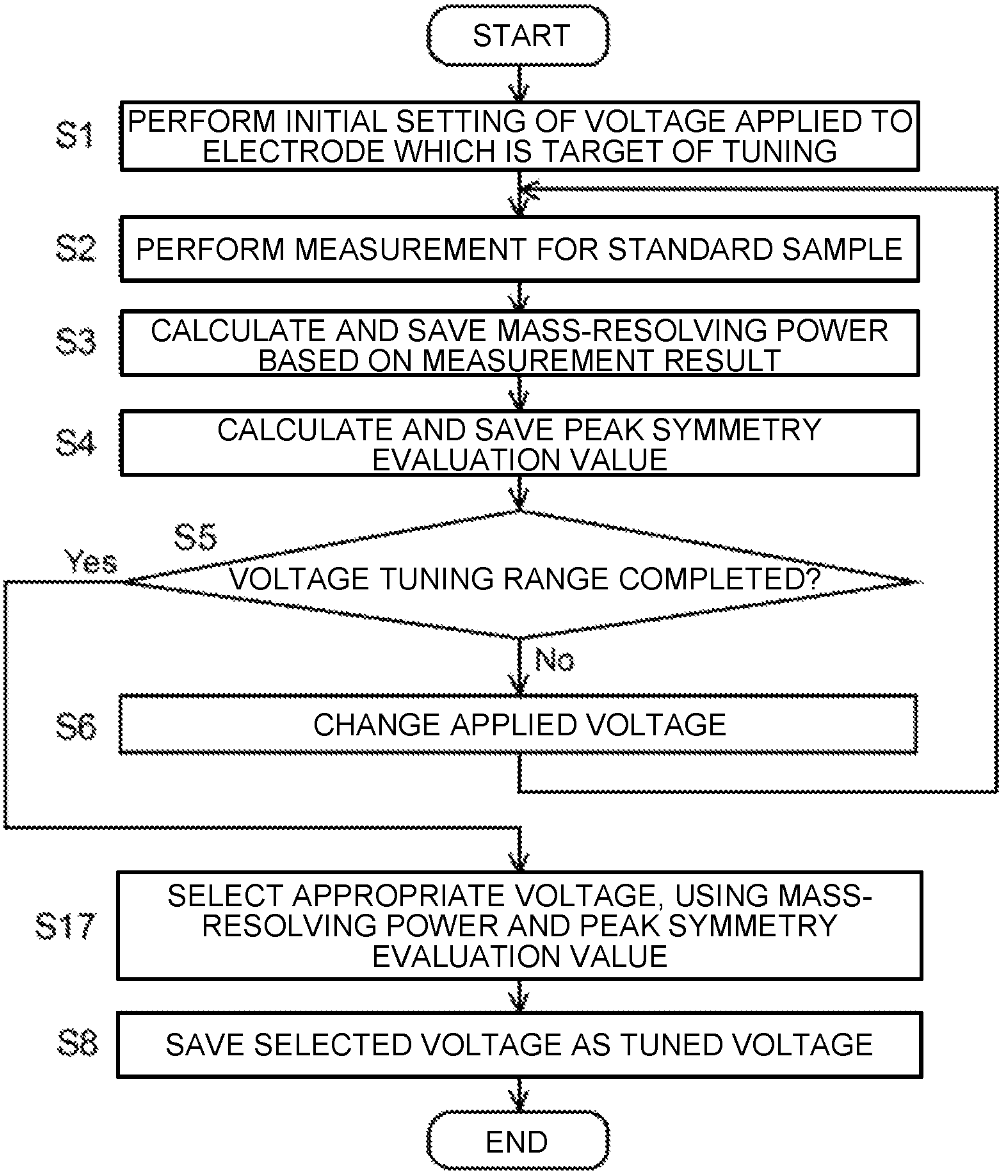
FIG. 5 is a flowchart showing the flow of an auto-tuning operation in a modified example.

In the Q-TOFMS according to the previously described embodiment, the peak symmetry evaluation value is not directly used for the auto-tuning. It is also possible to use the peak symmetry evaluation value for the auto-tuning. FIG. 5 is a flowchart showing the flow of an auto-tuning operation in a Q-TOFMS according to a modified example. The steps which perform substantially identical processing operations to those in the flowchart shown in FIG. 2 are denoted by identical step numbers.

The present example is identical to the previously described embodiment in that a measurement is performed while the voltage given to the orthogonal accelerator 151 is gradually varied, and the mass-resolving power and the peak symmetry evaluation value corresponding to each voltage value are calculated and stored. In the Q-TOFMS according to the present modified example, when the determination result in Step S5 is “Yes”, the tuning executer 33 selects a voltage which is appropriate on a general basis, using both the mass-resolving power and the peak symmetry evaluation value as well as an optional index which represents sensitivity (Step S17). For example, a score value based on a predetermined calculation formula is calculated from the mass-resolving power and the peak symmetry evaluation value, and a voltage which maximizes this score value is selected. By appropriately determining the calculation formula, a voltage can be found which yields a high level of mass-resolving power that exceeds a certain value, if not the maximum value, while significantly reducing the asymmetry in peak shape.

It is also possible to automatically perform a tuning operation similar to the previously described manual voltage-tuning operation for reducing the leading and/or tailing edge of the peak based on the peak symmetry evaluation value. Specifically, the tuning executer 33 may be configured to monitor the peak symmetry evaluation value determined from a measurement result and tune the voltage so that the evaluation value will be close to zero or be smaller than a predetermined value.

Although the previously described embodiment and modified example are examples in which the present invention is applied in a reflectron type of orthogonal TOFMS, the present invention is not limited to the reflectron type; it may also be applied in other types of TOFMS having a different form of flight path, such as a linear or multiturn TOFMS. In a linear TOFMS, the flight tube is the only electrode included in the flight-field creation section. In a multiturn TOFMS, the electrodes in the flight-field creation section include electrodes for causing ions to fly in a loop path (or to fly in a helical path or the like) as well as an electrode for introducing ions into the aforementioned path and/or causing ions to leave the aforementioned path.

The present invention is not limited to the orthogonal acceleration system; for example, it can also be applied to an ion trap TOFMS in which measurement-target ions are temporarily held in a linear ion trap or three-dimensional quadrupole ion trap, and an acceleration voltage is applied to the electrodes forming the ion trap to eject the ions from the ion trap into the flight space. In that case, the electrodes included in the ion acceleration section are the electrodes forming the ion trap.

The present invention can also be applied in a type of TOFMS in which ions generated from a sample in the ion source are immediately extracted from the vicinity of the sample and accelerated into the flight space, as in a MALDI-TOFMS which employs a matrix-assisted laser desorption/ionization source as the ion source. In that case, the electrodes included in the ion acceleration section are an extracting electrode for extracting ions from the vicinity of the sample and an acceleration electrode for accelerating the extracted ions.

Furthermore, the previously described embodiment as well as the various modified examples described thus far are mere examples of the present invention. It is evident that any modification, change or addition appropriately made within the spirit of the present invention will fall within the scope of claims of the present application.

[Various Modes]

It is evident for a person skilled in the art that the previously described illustrative embodiment is a specific example of the following modes of the present invention.

(Clause 1) One mode of the TOFMS according to the present invention is a TOFMS having a measurement unit which includes a flight-field creation section configured to create, within a flight space, an electric field for causing ions to fly, and an ion acceleration section configured to accelerate ions which are a measurement target and to send the ions into the flight space, the TOFMS including:

a data-analysis processor configured to create a spectrum based on data acquired by the measurement unit, the spectrum showing a relationship between ion intensity and time of flight or mass-to-charge ratio;

an index calculator configured to calculate, as an index concerning a peak observed in the spectrum, a difference in time of flight or mass-to-charge ratio between a midpoint of a first peak width at an intensity which equals the top intensity of the peak multiplied by a first ratio and a midpoint of a second peak width at an intensity which equals the top intensity of the peak multiplied by a second ratio which is smaller than the first ratio; and an evaluation result storage section configured to evaluate a degree of symmetry of the peak from the index and to store an evaluation result.

The TOFMS according to Clause 1 can show users an evaluation result which reflects the degree of symmetry of the true peak profile more correctly than the asymmetry factor or other conventionally used indices, even when the number of discrete measurement points (data points) forming the peak observed in a mass spectrum or time-of-flight spectrum is small.

(Clause 2) In the TOFMS according to Clause 1, the first ratio may be between 40% and 60%, inclusive.

(Clause 3) In the TOFMS according to Clause 1 or 2, the second ratio may be between 5% and 30%, inclusive.

By the TOFMS s according to Clauses 2 and 3, an evaluation result which properly shows the degree of symmetry of the peak can be obtained.

(Clause 4) The TOFMS according to one of Clauses 1-3 may further include a display processor configured to display the evaluation result obtained by the evaluation result storage section.

The TOFMS according to Clause 4 allows a user or maintenance service person to easily check a peak symmetry evaluation result collected in a previous auto-tuning operation (or the like), to determine the condition of the device or manually tune the voltage based on the evaluation result.

(Clause 5) The TOFMS according to one of Clauses 1-3 may include a tuning section configured to tune a voltage applied to at least one electrode included in the measurement unit, using the evaluation result obtained by the evaluation result storage section.

The TOFMS according to Clause 5 can appropriately and automatically tune a voltage applied to an electrode so that the peak will be roughly symmetrical.

(Clause 6) The TOFMS according to one of Clauses 1-5 may further include a tuning section configured to conduct a measurement using the measurement unit while varying a voltage applied to at least one electrode included in the measurement unit, and to tune the voltage using one or more of the mass-resolving power, the sensitivity, and the mass-peak waveform shape based on a result of the measurement, and the index calculator may calculate the index based on the result of the measurement every time the measurement is conducted with the voltage varied by the tuning section.

The TOFMS according to Clause 6 can tune a voltage applied to an electrode so as to maximize or nearly maximize the mass-resolving power, for example, and can also obtain an evaluation result showing the degree of symmetry of the peak during the tuning process. This enables the checking of not only an evaluation result corresponding to the tuned voltage but also an evaluation result corresponding to each voltage in the middle of the tuning process. Therefore, for example, a voltage at which the peak has the highest degree of symmetry can be found.

(Clause 7) The TOFMS according to Clause 6 may further include an ion introduction section configured to introduce ions into the ion acceleration section, with the ion acceleration section configured to accelerate the introduced ions in a direction orthogonal to the introduction of the ions, and the flight-field creation section including a flight tube configured to form a space which allows ions to freely fly and a reflectron configured to create an electric field which reflects ions, and the tuning section may be configured to tune a voltage applied to at least one electrode included in the ion acceleration section, the flight tube or the reflectron.

(Clause 8) In the TOFMS according to Clause 7, the ion acceleration section may include a first acceleration electrode to which a pulse voltage for accelerating ions is to be applied and a second acceleration electrode to which a voltage for further accelerating the ions already accelerated by the first acceleration electrode is to be applied, and the tuning section may be configured to tune the voltage applied to the first acceleration electrode or the second acceleration electrode.

By the configuration of TOFMS s according to Clauses 7 and 8, a Q-TOFMS can be properly tuned so as to achieve a high level of mass-resolving power.

(Clause 9) One mode of the tuning method for a TOFMS according to the present invention is a tuning method for a TOFMS having a measurement unit which includes a flight-field creation section configured to create, within a flight space, an electric field for causing ions to fly, and an ion acceleration section configured to accelerate ions which are a measurement target and to send the ions into the flight space, the tuning method including:

a data-analysis processing step for creating a spectrum based on data acquired by the measurement unit, the spectrum showing a relationship between ion intensity and time of flight or mass-to-charge ratio;

an index calculation step for calculating, as an index concerning a peak observed in the spectrum, a difference in time of flight or mass-to-charge ratio between a midpoint of a first peak width at an intensity which equals the top intensity of the peak multiplied by a first ratio and a midpoint of a second peak width at an intensity which equals the top intensity of the peak multiplied by a second ratio which is smaller than the first ratio; and a tuning step for tuning a voltage applied to an electrode included in the measurement unit, using at least either the index or another numerical value derived from the index.

By the tuning method for a TOFMS according to Clause 9, a voltage applied to an electrode included in the measurement unit can be properly tuned so that the peak profile will have a satisfactory degree of symmetry.

REFERENCE SIGNS LIST

1 . . . Measurement Unit
10 . . . Vacuum Chamber
11 . . . Ionization Chamber
111 . . . ESI Source
112 . . . Desolvation Tube
12 . . . First Intermediate Vacuum Chamber
121 . . . Ion Guide
122 . . . Skimmer
13 . . . Second Intermediate Vacuum Chamber
131 . . . Ion Guide
14 . . . First Analysis Chamber
141 . . . Quadrupole Mass Filter
142 . . . Collision Cell
143 . . . Ion Guide
144 . . . Transfer Electrode
15 . . . Second Analysis Chamber
151 . . . Orthogonal Accelerator
1511 . . . Push-Out Electrode
1512 . . . Pulling Electrode
152 . . . Second Acceleration Electrode Unit
153 . . . Flight Tube
154 . . . Reflectron
155 . . . Back Plate
156 . . . Ion Detector
2 . . . Voltage Source
3 . . . Control-and-Processing Unit
4 . . . Input Unit
5 . . . Display Unit

The invention claimed is:

1. A time-of-flight mass spectrometer having a measurement unit which includes a flight-field creation section configured to create, within a flight space, an electric field for causing ions to fly, and an ion acceleration section configured to accelerate ions which are a measurement target and to send the ions into the flight space, the time-of-flight mass spectrometer comprising:

a data-analysis processor configured to create a spectrum based on data acquired by the measurement unit, the spectrum showing a relationship between ion intensity and time of flight or mass-to-charge ratio;

an index calculator configured to calculate, as an index concerning a peak observed in the spectrum, a difference in time of flight or mass-to-charge ratio between a midpoint of a first peak width at an intensity which equals a top intensity of the peak multiplied by a first ratio and a midpoint of a second peak width at an intensity which equals the top intensity of the peak multiplied by a second ratio which is smaller than the first ratio; and an evaluation result storage section configured to evaluate a degree of symmetry of the peak from the index and to store an evaluation result.

2. The time-of-flight mass spectrometer according to claim 1, wherein the first ratio is between 40% and 60%, inclusive.

3. The time-of-flight mass spectrometer according to claim 1, wherein the second ratio is between 5% and 30%, inclusive.

4. The time-of-flight mass spectrometer according to claim 1, further comprising a display processor configured to display the evaluation result obtained by the evaluation result storage section.

5. The time-of-flight mass spectrometer according to claim 1, further comprising a tuning section configured to tune a voltage applied to at least one electrode included in the measurement unit, using the evaluation result obtained by the evaluation result storage section.

6. The time-of-flight mass spectrometer according to claim 1, further comprising a tuning section configured to conduct a measurement using the measurement unit while varying a voltage applied to at least one electrode included in the measurement unit, and to tune the voltage using one or more of a mass-resolving power, a sensitivity, and a mass-peak waveform shape based on a result of the measurement, wherein the index calculator is configured to calculate the index based on the result of the measurement every time the measurement is conducted with the voltage varied by the tuning section.

7. The time-of-flight mass spectrometer according to claim 6, further comprising an ion introduction section configured to introduce ions into the ion acceleration section, with the ion acceleration section configured to accelerate the introduced ions in a direction orthogonal to an introduction of the ions, and the flight-field creation section comprising a flight tube configured to form a space which allows ions to freely fly and a reflectron configured to create an electric field which reflects ions, wherein the tuning section is configured to tune a voltage applied to at least one electrode included in the ion acceleration section, the flight tube or the reflectron.

8. The time-of-flight mass spectrometer according to claim 7, wherein the ion acceleration section comprises a first acceleration electrode to which a pulse voltage for accelerating ions is to be applied and a second acceleration electrode to which a voltage for further accelerating the ions already accelerated by the first acceleration electrode is to be applied, and the tuning section is configured to tune the voltage applied to the first acceleration electrode or the second acceleration electrode.

9. A tuning method for a time-of-flight mass spectrometer having a measurement unit which includes a flight-field creation section configured to create, within a flight space, an electric field for causing ions to fly, and an ion acceleration section configured to accelerate ions which are a measurement target and to send the ions into the flight space, the tuning method comprising:

a data-analysis processing step for creating a spectrum based on data acquired by the measurement unit, the spectrum showing a relationship between ion intensity and time of flight or mass-to-charge ratio;

an index calculation step for calculating, as an index concerning a peak observed in the spectrum, a difference in time of flight or mass-to-charge ratio between a midpoint of a first peak width at an intensity which equals a top intensity of the peak multiplied by a first ratio and a midpoint of a second peak width at an intensity which equals the top intensity of the peak multiplied by a second ratio which is smaller than the first ratio; and a tuning step for tuning a voltage applied to an electrode included in the measurement unit, using at least either the index or another numerical value derived from the index.

* * * * *